United States Patent [19]

Therkildsen

[11] 4,075,894
[45] Feb. 28, 1978

[54] WINCH DRUM HYDRAULIC DISCONNECT

[75] Inventor: Henry T. Therkildsen, East Peoria, Ill.

[73] Assignee: Caterpillar Tractor Co., Peoria, Ill.

[21] Appl. No.: 753,679

[22] Filed: Dec. 23, 1976

[51] Int. Cl.² ............................................. F16H 37/00
[52] U.S. Cl. .................................................. 74/15.69
[58] Field of Search ....................... 74/331, 15.69, 335

[56] References Cited

U.S. PATENT DOCUMENTS

| 2,885,907 | 5/1959 | Glamann | 74/15.69 X |
| 3,513,712 | 5/1970 | Zajichek et al. | 74/15.69 X |

*Primary Examiner*—Leonard H. Gerin

*Attorney, Agent, or Firm*—Phillips, Moore, Weissenberger, Lempio & Majestic

[57] ABSTRACT

The invention relates to an improvement in a drum rotating apparatus which comprises an input gear, a drive train for selectively drivingly rotating the input gear about its axis in a first and in a second direction, a transfer gear meshing with the input gear and driven thereby, a shaft rotatably driven by the transfer gear and having teeth thereon, an output gear meshing with the teeth on the shaft and driven thereby and a drum secured to the output gear to rotate therewith. The improvement comprises a normally engaged coupling intermediate the transfer gear and the shaft and hydraulic disengaging apparatus which serves to disengage the normally engaged coupling to allow the drum to rotate unencumbered by the input gear and the drive train.

9 Claims, 5 Drawing Figures

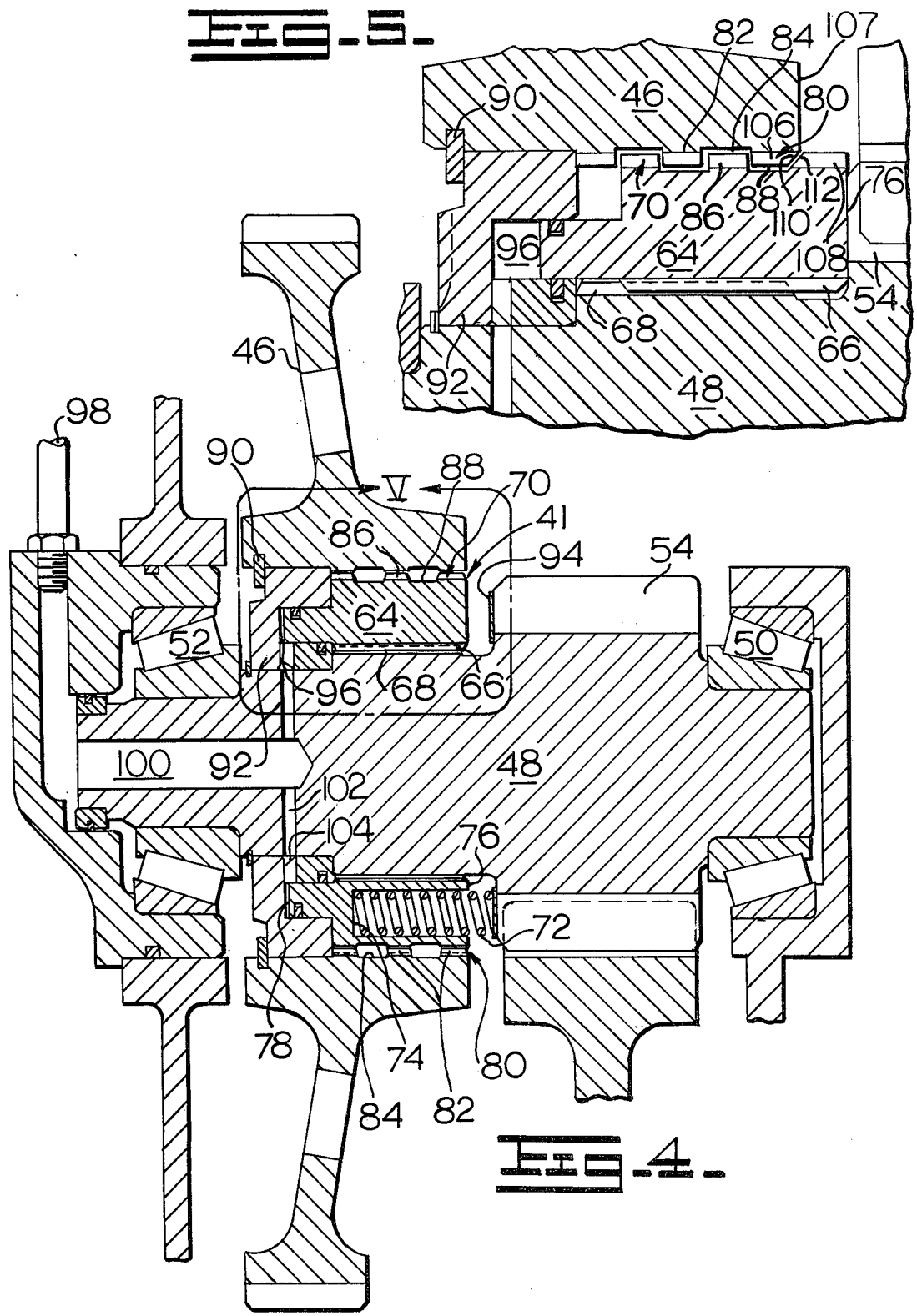

WINCH DRUM HYDRAULIC DISCONNECT

BACKGROUND OF THE INVENTION

1. Field of the Invention

The present invention relates to a winch assembly of the type including a plurality of clutches within an intermediate power train for selectively regulating operation of a winch drum. The present invention is more particularly directed towards a winch drum hydraulic disconnect providing a selective coupling between the power train and the cable drum to facilitate "freewheeling" of the cable drum with relatively little movement of parts.

2. Prior Art

The prior art teaches a variety of more or less conventional power train for operating such winch or cable drums. One such arrangement, as described in some detail below and as is better and more fully described in U.S. Pat. No. 3,848,852, commonly assigned herewith, includes a pair of opposed clutches which are selectively operable to rotate the cable drum in opposite directions and provide for reeling-in and reeling-out operation of the winch assembly. Other power train arrangement operable within the scope of the present invention might include a single clutch providing for reeling-in operation of the cable drum and another normally engaged clutch which may be selectively engaged to resist rotation of the cable drum in an opposite direction under the influence of external forces during reeling-out operation.

The present invention provides a simple and effective hydraulic disconnect coupling for selectively engaging or disengaging a power train from a cable drum in order to facilitate free-wheeling operation of the winch assembly with a minimal amount of axial travel of the disconnect coupling and a reduction in the width and weight of the transmission and which also reduces wear and tear on the clutches and brakes of the drive train.

SUMMARY OF THE INVENTION

The invention is concerned with an improvement in a winch drum rotating apparatus which comprises an input gear, means for selectively driving the input gear about its axis in a first and in a second direction, a transfer gear meshing with the input gear and driven thereby, a shaft rotatably driven by the transfer gear and having gear engaging means thereon, an output gear meshing with the gear engaging means and driven thereby and a drum secured to the output gear to rotate therewith. The improvement of the present invention comprises a normally engaged linearly movable ring coupling intermediate the transfer gear and the shaft and means for hydraulically disengaging said normally engaged ring coupling to allow the drum to rotate unencumbered by the input gear and the means for selectively drivingly rotating the input gear.

BRIEF DESCRIPTION OF THE DRAWINGS

The invention will be better understood by reference to the figures of the drawings and the description which follows wherein additional objects and advantages of the invention are made apparent and wherein like numbers denote like parts throughout and wherein:

FIG. 4 illustrates in an enlarged fragmentary view with parts in section a linearly movable ring coupling arranged with the power train in accordance with the present invention; and FIG. 5 illustrates in greatly enlarged view a portion of the winch assembly according to the present invention with the movable ring coupling disengaged.

DETAILED DESCRIPTION OF THE PREFERRED EMBODIMENT

Figure 1:
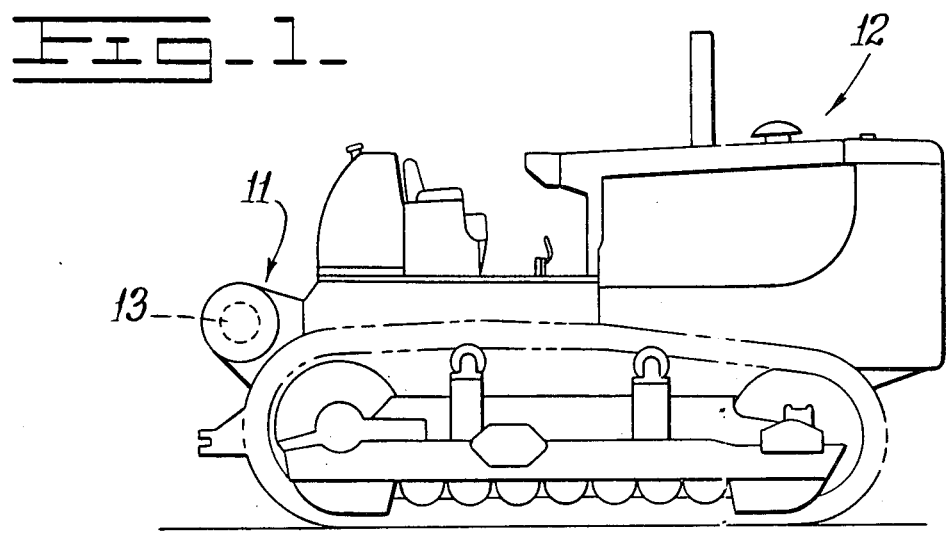
FIG. 1 illustrates in side elevational view, a track-type tractor having a towing winch assembly constructed according to the present invention.

Referring to the drawings and particularly to FIG. 1, a towing winch assembly 11 constructed according to the present invention is mounted upon a track-type tractor 12 and includes a rotatable cable drum 13. The cable drum is operated by a power train for the winch assembly as described in greater detail below to provide for generally conventional reeling-in and reeling-out operation of a cable (not shown).

Figure 2:
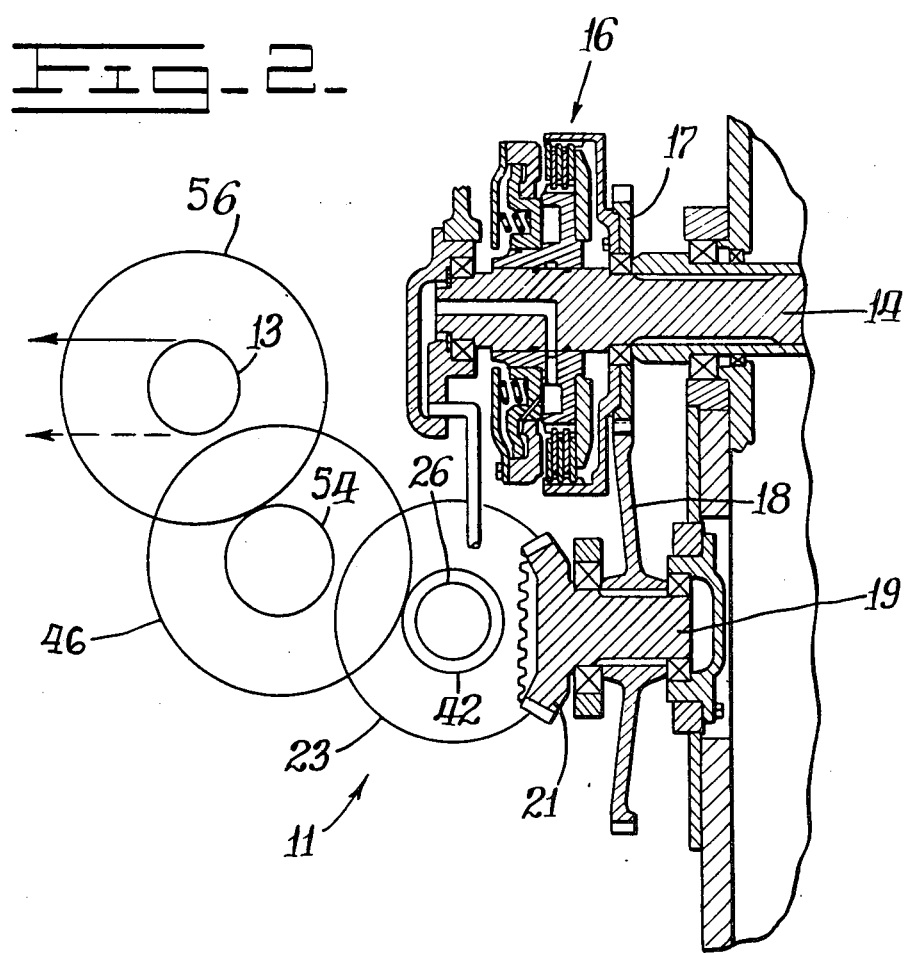
FIGS. 2 and 3 illustrate sectional views showing the power train of the winch assembly in greater detail.
Figure 3:
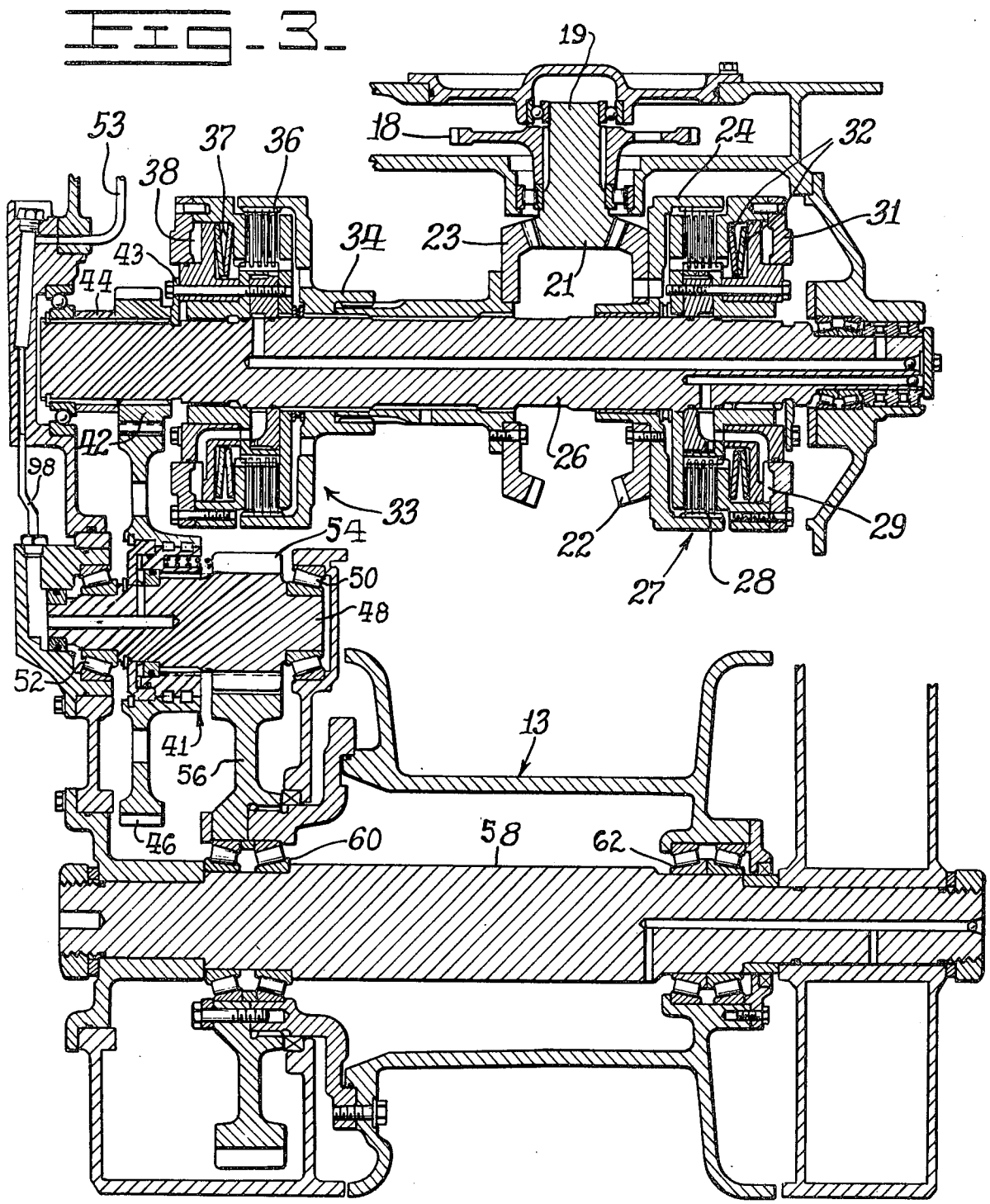

The power train for the winch assembly is best illustrated in FIGS. 2 and 3. Referring now to those figures, a power input means or shaft 14 for the winch assembly may comprise a conventional power take-off for a prime mover or internal combustion engine (not shown) of the tractor 12 of FIG. 1.

A normally disengaged input clutch 16 is actuated to selectively couple the input shaft 14 with a gear 17. The gear 17 meshes with a gear 18 which in turn is splined to a rotatable input shaft 19. One end of the input shaft 19 is secured to a first bevel gear 21 which meshes with opposed second and third bevel gears 22 and 23. The bevel gear 22 is secured to a carrier 24 which is rotatably mounted on an elongated shaft 26. The carrier and shaft are adapted to be coupled together by a normally engaged winch clutch 27 comprising interleaved friction discs 28 which are alternately mounted for axial movement on the carrier and shaft by means of conventional splined connections. The friction discs are disengaged by fluid pressure in a clutch chamber 29 acting upon an annular piston assembly 31 to move the piston assembly rightwardly as viewed, for example, in FIG. 3. The discs are normally compressed together to engage the clutch by means of Belleville-type spring plates 32 arranged in back-to-back relation.

The bevel gear 23 is similarly coupled with a second winch clutch 33 which comprises a carrier 34, rotatably mounted on the common shaft 25 and coupled to the gear 23, and interleaved clutch discs 36 which are alternately splined for axial movement on the carrier and shaft. Belleville-type spring plates 37 normally engage the clutch while fluid pressure in an actuating chamber 38 tends to disengage the clutch by moving the piston assembly leftwardly as viewed, for example, in FIG. 3. When both of the clutches 27 and 33 are engaged by spring force, the shaft 26 is locked against rotation.

According to the present invention, the elongated shaft 26 is operatively coupled with the cable drum 13 by a normally engaged linearly movable ring coupled indicated at 41 which is described in greater detail below and is normally engaged so that the cable drum 13 is coupled for rotation with the shaft 26. Thus, when only the second winch clutch 33 is disengaged, the bevel gear 22 rotates the carrier 24 and thus the shaft 26 in a first direction of rotation. Conversely, when only the first winch clutch 27 is disengaged, the bevel gear 23 imparts rotation to the carrier 34 and the shaft 26 in the opposite direction of rotation. The clutches 27 and 33 tend in this manner to provide for power operation of the shaft 26 and the cable drum 13 in either "reeling-in" or "reeling-out" modes of operation. The normally engaged linearly movable ring coupling 41 may thus be selectively disengaged to permit free-wheeling rotation of the cable drum 13 free from "drag" which might otherwise be caught by the shaft 26 and other components associated with rotation therewith.

An input gear 42 is arranged about the shaft 26 and is driven thereby as by being spliningly connected therewith. The gear 42 is fixed against axial movement relative to the shaft 26 as for example by a thrust plate 43 and a sleeve 44, which fits about the shaft 26 on an opposite side of the gear 42 from the thrust plate 43. The gear 42 meshes with a transfer gear 46 which is mounted in accordance with the present invention to the normally engaged linearly movable ring coupling 41, which ring coupling 41 is drivingly mounted to a shaft 48 which is rotatably mounted by bearings 50 and 52. The particular operation of the ring coupling 41 will be described in greater detail below.

The shaft 48 has gear engaging means 54 thereon. An output gear 56 meshes with the gear engaging means 54 and is driven thereby. The output gear 56 is secured to the cable drum 13 for rotation therewith. The cable drum 13 is secured and mounted for rotation upon a shaft 58 by means of bearings 60 and 62.

Controls for operating the opposed clutches 27 and 33 as well as the link coupling 41 are not a feature of the present invention and may be of conventional construction and therefore have been omitted from the drawings for the purpose of clarity. However, as noted above, the clutches 27 and 33 may be actuated independently or together in the same manner by similar means as are disclosed, for example, in U.S. Pat. No. 3,729,171 entitled "Reversable Towing Winch and Method for Operating Same", commonly assigned herewith. As disclosed in that patent, hydraulic actuation of one of the clutches 27 and 33 provides for reeling-in operation while actuation of the other clutches 27 and 33 provides for reeling-out operation and simultaneous actuation of the two clutches provides for brake-off operation. The movable ring coupling 41 can, of course, be actuated by a similar valve arrangement or by means of an electric solenoid and auxiliary disconnect switch (neither shown) which would be actuatable in free-wheeling mode of operation to move the ring coupling 41 and thus uncouple the transfer gear 46 from the ring coupling 41 in a manner which will be described immediately below.

Adverting now principally to FIG. 4, there is illustrated in greater detail the normally engaged linearly movable ring coupling 41. The ring coupling 41 includes a ring 64, having an inner spline 66 slidably engaged with a spline 68 on the shaft 48. The ring 64 also includes a segmented outer spline 70 and biasing means, in the embodiment illustrated, a plurality of springs 72, each fitting within a respective well 74 of a plurality of such wells which extend into the ring 64 parallel to the axis thereof from a first end 76 thereof towards a second end 78 thereof. The springs 72 serve to bias the coupling leftwardly in FIG. 4 into a first position thereof. The transfer gear 46 includes a segmented inner spline 80 which meshes with the segmented outer spline 70 of the ring 64 when the ring 64 is in said first position. The segmented inner spline 80 of the transfer gear 46 comprises a first plurality of inner teeth 82 with spaces 84 therebetween separated linearly along the transfer gear 46. The segmented outer spline 70 of the ring 64 comprises a second plurality of (outer) teeth 86 with spaces 88 therebetween separated linearly along the ring 64. The aforementioned first position of the ring 64 corresponds to meshing of the first plurality of teeth 82 with the second plurality of teeth 86 and the second position corresponds to the first plurality of teeth 82 fitting within the spaces 88 between the second plurality of teeth 86 and the second plurality of teeth fitting within the spaces 84 between the first plurality of teeth 82. The transfer gear 46 is prevented from moving axially relatively to the shaft 48 by retaining means, namely a retaining ring 90 which is fastenably attached to a flange 92 extending outwardly from the shaft 48. Thus, as the ring 64 is moved in a manner which will be explained in the following, the transfer gear 46 cannot be carried along with the ring 64 because of the presence of the retaining ring 90.

As will be noted, the springs 72 preferably act between the ring 64 and a ring facing end 94 of the gear engaging means 54. The ring facing end of the gear engaging means generally serves a second purpose along with the first end 76 of the ring 64, namely, the purpose of providing stopping means for stopping the ring 64 from moving beyond the aforementioned second position thereof wherein the first plurality of teeth 82 and the second plurality of teeth 86 are not in meshing contact.

The ring 64 is generally hydraulically disengaged from its normally engaged position with the transfer gear 46. Basically, the hydraulic disengaging comprises applying pressurized fluid against the second end 78 of the ring 64 to force it rightwardly in FIG. 4 whereby the first plurality of teeth 82 fit within the spaces 88 and the second plurality of teeth 86 fit within the spaces 84. This allows the drum 13 to rotate unencumbered by the transfer gear 46, the input gear 42 and the remainder of the drive chain controlled by the clutches 27 and 33. The means for hydraulically disengaging the ring 64, or more particularly for moving it to the aforementioned second position thereof comprises an annular chamber 96 formed by the shaft 48 or in the embodiment illustrated more particularly formed by the flange 92 extending outwardly therefrom. The second end 78 of the ring 64 slidingly fits in a sleeve piston type arrangement within the chamber 96. Hydraulic fluid conduit means, in the embodiment illustrated the hydraulic fluid line 98 which communicates with an axial bore 100 in the shaft 48, which axial bore communicates via radially bore means 102 and chamfers 104 with the annular chamber 96 to form the hydraulic disengaging means. Thus, it is clear that as pressure is applied to the hydraulic fluid conduit 98 it will be carried to the chamber 96 and that this pressure will force the ring 64 to move rightwardly until a first end 76 thereof contacts a ring 94 attached to the ring facing end of the gear engaging means 54 whereby the first plurality of teeth 83 fit within the spaces 88 and the second plurality of teeth 86 fit within the spaces 84. It is clear that in this manner free-wheeling operation of the drum can be attained. When the hydraulic pressure is released the springs 72 force the ring 64 leftwardly into the position shown in FIG. 4.

Turning now most particularly to FIG. 5, there is illustrated in greatly enlarged view a portion of the first plurality of teeth 82 and the second plurality of teeth 86. As will be noted by reference to FIG. 5, the first plurality of teeth 82 includes first wider teeth 106 adjacent a first end 107 of the transfer gear 46, which first end 107 is adjacent the first end 76 of the ring 64. The second plurality of teeth 86 includes second wider teeth 108 adjacent the first end 76 of the ring 64 for engagement with the first wider teeth 106. As will further be noted by reference to FIG. 5, the first wider teeth 106 have a first rounded edge 110 facing towards the gear engaging means 54 and the second wider teeth 108 have a second rounded edge 112 facing away from the gear engaging means 54. The spaces 84 and 88 next adjacent the first wider teeth 106 and the second wider teeth 108 respectively are so sized and positioned that the first wider teeth 106 and the second wider teeth 108 engage before engagement of other teeth of the first plurality of teeth 82 and the second plurality of teeth 86. The first wider teeth 106 and the second wider teeth 108 bring the first plurality of teeth 82 and the second plurality of teeth 86 into alignment by virtue of their rounded edges 110 and 112 thus serving to prevent jamming of the first plurality of teeth 82 with the second plurality of teeth 86.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a drum rotating apparatus which comprises an input gear, means for selectively drivingly rotating said input gear about its axis in a first and a second direction, a transfer gear meshing with said input gear and driven thereby, a shaft rotatably driven by said transfer gear and having gear engaging means thereon, an output gear meshing with said gear engaging means and driven thereby and a drum secured to said output gear to rotate therewith, an improvement comprising:
   a normally engaged linearly movable ring coupling intermediate said transfer gear and said shaft; and
   means for hydraulically disengaging said normally engaged ring coupling to allow said drum to rotate unencumbered by said input gear and said means for selectively drivingly rotating said input gear.

2. An improvement as in claim 1, wherein:
   said normally engaged ring coupling comprises a ring having an inner spline slidably engaged with a spline on said shaft and a segmented outer spline, and biasing means acting between said ring and said shaft to bias said coupling into a first position;
   said transfer gear includes a segmented inner spline which meshes with said segmented outer spline of said ring when said ring is in said first position; and
   said hydraulic disengaging means moves said ring against said biasing means to a second position whereat said segmented inner spline of said transfer gear does not mesh with said segmented outer spline of said ring.

3. An improvement as in claim 2, wherein said segmented inner spline comprises a first plurality of teeth with spaces therebetween separated linearly along said transfer gear; said segmented outer spline comprises a second plurality of teeth with spaces therebetween separated linearly along said ring, said first position corresponds to meshing of said first and second pluralities of teeth and said second position corresponds to said first plurality of teeth fitting within the spaces between said second plurality of teeth and said second plurality of teeth fitting within the spaces between said first plurality of teeth.

4. An improvement as in claim 3, wherein said biasing means comprises a plurality of springs each fitting within a respective one of a plurality of wells extending into said ring parallel to the axis thereof from a first end towards a second end thereof and said hydraulic disengaging means comprises an annular chamber formed by said shaft in which said second end of said ring slidingly fits and hydraulic fluid conduit means communicating with said annular chamber.

5. An improvement as in claim 4, including means for stopping said ring from moving beyond said second position under the impetus of said hydraulic disengaging means.

6. An improvement as in claim 5, including retaining means preventing said transfer gear from moving axially relative to said shaft.

7. An improvement as in claim 6, wherein said springs act between said ring and a ring facing end of said gear engaging means and said stopping means comprises said first end of said ring and said ring facing end of said gear engaging means.

8. An improvement as in claim 7, wherein said hydraulic disengaging means comprises an axial bore in said shaft and radial bore means extending from said axial bore towards said annular chamber.

9. An improvement as in claim 7, wherein said first plurality of teeth includes first wider teeth for engagement adjacent said first end of said ring and said second plurality of teeth includes second wider teeth adjacent said first end of said ring for engagement with said first wider teeth, said first wider teeth having a first rounded edge facing towards said gear engaging means and said second wider teeth having a second rounded edge facing away from said gear engaging means.

* * * * *